US006016522A

United States Patent [19]

Rossum

[11] Patent Number: 6,016,522

[45] Date of Patent: Jan. 18, 2000

[54] SYSTEM FOR SWITCHING BETWEEN BUFFERS WHEN RECEIVING BURSTY AUDIO BY COMPUTING LOOP JUMP INDICATOR PLUS LOOP START ADDRESS FOR READ OPERATIONS IN SELECTED BUFFER

[75] Inventor: David P. Rossum, Monterey, Calif.

[73] Assignee: Creative Labs, Inc., Milpitas, Calif.

[21] Appl. No.: 08/969,684

[22] Filed: Nov. 13, 1997

[51] Int. Cl.[7] .......... G06F 13/00; G06F 13/28

[52] U.S. Cl. .......... 710/52; 710/53; 710/22; 711/147; 711/209; 84/604

[58] Field of Search .......... 710/3, 22, 52, 710/53, 56; 711/147, 209; 84/602, 603, 604, 630

[56] References Cited

U.S. PATENT DOCUMENTS

| | | | |
|---|---|---|---|
| 5,224,213 | 6/1993 | Dieffenderfer et al. | 395/250 |
| 5,342,990 | 8/1994 | Rossum | 84/603 |
| 5,376,752 | 12/1994 | Limberis et al. | 84/622 |
| 5,521,928 | 5/1996 | Worsley et al. | 370/67 |
| 5,561,777 | 10/1996 | Kao et al. | 395/405 |
| 5,864,876 | 1/1999 | Rossum et al. | 711/206 |

FOREIGN PATENT DOCUMENTS

| | | |
|---|---|---|
| 408094724A | 4/1996 | Japan . |

OTHER PUBLICATIONS

Limberis, Alex et al., An Architecture for a . . . Dynamic Voice Allocation, Oct. 7–10, 1993, AES 95th Convention, New York.

*Primary Examiner*—Thomas C. Lee
*Assistant Examiner*—Chun Cao
*Attorney, Agent, or Firm*—Townsend and Townsend and Crew LLP

[57] ABSTRACT

Method and apparatus for wavetable style playback of audio data received from a bursty source is disclosed. Incoming audio data is directed to one buffer while another buffer is available for playback to permit simultaneous buffer filling and playback. When a buffer becomes full of newly received data, the buffers exchange roles. Methods and apparatus for efficiently and accurately controlling addressing of the buffers for playback are disclosed.

14 Claims, 3 Drawing Sheets

SYSTEM FOR SWITCHING BETWEEN BUFFERS WHEN RECEIVING BURSTY AUDIO BY COMPUTING LOOP JUMP INDICATOR PLUS LOOP START ADDRESS FOR READ OPERATIONS IN SELECTED BUFFER

BACKGROUND OF THE INVENTION

The present invention relates to buffering audio data from a bursty source and reading out the buffered audio data for playback.

The technique of "double buffering" is a well known technique for receiving digital audio data from a bursty source. Initially, audio data words are received in sequence, and placed in successive locations in a first buffer memory. When this first buffer is full, subsequent data words are placed in successive locations in a second buffer memory. While the first buffer memory is being processed, the second buffer memory can be filled, and the data in the first buffer remains unchanged during processing. Similarly, when the processing proceeds to the second buffer, subsequent data words received are placed in successive locations of the first memory, over-writing the previous values. During this re-filling of the first buffer memory, the contents of the second buffer memory remain unchanged during processing. This back and forth processing is also sometimes called "ping-pong" buffering.

The technique of playing back continuous loops of audio from a memory loaded with audio data by a CPU is also well known, and is a common element of "wavetable" music synthesizers. It such synthesizers, digital audio data words are stored by the CPU in a memory. When this audio data is played back, two data word locations in memory are designated as the "start" and "loop" point in the memory. While looping, when the location in memory immediately preceding the loop point is played back, the playback then skips back to play the start point, which is prior to the loop point in memory. Thus the sound between the start and loop points is repeated. This typically occurs for the duration that a musician depresses the synthesizer keyboard key designating that sound.

The algorithm by which looping is performed is generally described as follows: For each output sample, the playback address (which has both an integer and a fractional part) is increased by the phase increment (which also has an integer and fractional part). The value of the phase increment determines the playback pitch and playback sample rate of the sound. If the phase increment is exactly one, the sound is played back at its original pitch and sample rate, and output samples are played back in sequence. When looping is active, then after the phase increment is added to the playback address, the resulting sum is compared to the loop address. If the resulting sum is equal to or greater than the loop address, then the loop address is subtracted from the resulting sum and the start address is added to the result of that subtraction to form the new playback address. If the comparison indicates that the resulting sum is less than the loop address, then the resulting sum (which is the old playback address plus the phase increment) becomes then new playback address. This algorithm is repeated for successive samples. FIG. 1 depicts such a loop 100 which begins at a loop start address (LSA) 102 and ends at a loop end address (LEA) 104. A current address (CA) 106 and a next current address (CA') 108 are separated by a phase increment (PI) 110.

This algorithm is implemented simply in hardware by utilizing a single register with an enable, and an adder with a carry input and a carry output. The register contains the playback address. In a first step, the adder adds the phase increment to the register with the carry input negated, and the result is stored back in the register, so that the register now contains the sum of the previous playback address and the phase increment.

In a second step, the one's complement of the loop address is added to the register, with the carry input asserted. The carry output of this addition is examined. If the carry output is negated, indicating that the register value does not equal or exceed the loop address, then the register is disabled and remains unchanged. If the carry output is asserted, indicating that the register value equals or exceeds the loop address, then the register is enabled and acquires the output of the adder, which is the register value less the loop address.

In a third step, the register is added to the start address with the carry input negated. If the carry output was asserted during the previous step, then the register is enabled and acquires the result of this addition. If the carry output was negated during the previous step, then the register is disabled and remains unchanged. At this point, the looping algorithm is complete and the register contains the next playback address. This algorithm is performed once each output sample period for each audio channel. Note that the CA is updated by the algorithm, and that the LSA and LEA are only altered by the controlling CPU.

Those skilled in the art will easily perceive that the three steps above can be implemented in combination with other steps also using the same adder, and that the register can also be shared during other steps, and loaded from and saved to a memory as necessary to implement the above steps.

The assertion or negation of the carry output during the second step indicates if a loop occurred during the cycle. This can be used as the basis of an interrupt to a CPU which will occur once per loop at the time the playback address returned to the start point. Thus, wavetable looping has a very efficient and compact hardware implementation.

It would be useful to combine wavetable looping techniques with double buffering so that audio data received from bursty sources such as CD-ROM may be played back in wavetable fashion. However, there is a fundamental incompatibility between the typical wavetable looping scheme and the requirements of double buffering.

Assume that audio data is being played back from a double buffer system in accordance with conventional wavetable techniques. Audio data is currently being read out from the first buffer while the second buffer is being filled with data. However, soon playback will switch to the second buffer to allow filling of the first buffer. To prepare for the switch, the LSA is set at the beginning of the second buffer, and the LEA is set at the location just subsequent to the end of the first buffer in memory. CA' is compared to LEA after each addition of PI. When the loop occurs, i.e., CA' equals or exceeds LEA, playback jumps to the beginning of the now full second buffer, and the first buffer is filled with data while the data already loaded into the second buffer is being processed.

However, the above steps will only occur properly only if the second buffer is below the first buffer in the address space they share. If this were not the case, then on the cycle following the switchover, the comparison of CA to LEA would cause a false jump to an invalid location because the modification of LEA requires more time than the jump of CA. This is because the modification of LEA is directed by the CPU in response to an interrupt caused by the comparison a result that has an associated latency which can be longer than an output sample period. However, if the second buffer is below the first buffer in their shared address space, the switch from the second buffer to the first buffer will not occur correctly for the same reason. In other words, jumping from an LEA upward in memory is precluded by the conventional wave table looping algorithm.

One known solution to this problem is to provide distinct loop end address registers for each buffer and switch between them whenever switching between buffers. However, an important drawback is that an extra register is required, increasing the area and complexity of the playback circuitry. For example, in the context of a 64 voice playback system, 64 additional registers and accompanying interconnections would be needed.

Another solution is to position the buffers adjacent to each other in their shared memory space so that there is never a gap between them. After a jump to the buffer that is higher in address space, the loop end address and loop start address will both be equivalent to the boundary between the two buffers. When the looping condition is now met and the loop start address is added to the difference between the current address and the loop end address, the result is again the current address since the loop end address and loop start address are equivalent. Thus, the false looping condition does not cause a jump. However, the CPU that responds to interrupts caused by the satisfaction of the looping condition must be able to distinguish between interrupts that are and are not associated with actual jumps. Also, the need to maintain the buffers exactly adjacent to one another reduces system flexibility.

What is needed is an efficient system for combining double buffering and wavetable looping that avoids the above drawbacks by allowing an upward jump at the end of the loop.

SUMMARY OF THE INVENTION

In one embodiment, the present invention provides wavetable style playback of audio data received from a bursty source. Incoming audio data is directed to one buffer while another buffer is available for playback to permit simultaneous buffer filling and playback. When a buffer becomes full of newly received data, the buffers exchange roles. The present invention provides methods and apparatus for efficiently and accurately controlling addressing of the buffers for playback.

In accordance with one embodiment of the present invention, a method is provided for buffering audio data received from a bursty source and playing back the audio in a loop. The method includes steps of providing a first buffer and a second buffer, each of the buffers comprising a plurality of sequential memory locations in an address space common to both buffers, wherein audio data received from the source fills one of the first and the second buffers, the other buffer being available for loop playback, adding a phase increment to a current playback address thereafter subtracting a loop end address from the current playback address to obtain a loop jump indicator, and thereafter if the loop jump indicator is greater than or equal to zero and less than a minimum buffer spacing between the first and second buffers, setting the current address to be the loop jump indicator plus a loop start address.

In accordance with another aspect of the present invention, a loop control circuit is provided that generates a current address for read access operations to first and second buffers that share a common address space. The circuit includes a register, an adder circuit, and a control circuit. The control circuit controls the adder and register in sequential states. In a first state, the control circuit employs the adder circuit to add a phase increment to a current address for read operations stored in the register to obtain a new current address, storing the new current address in the register. In a second state following the first state, the control circuit employs the adder circuit to subtract a loop end address from the new current address as stored in the register to obtain a loop jump indicator, the loop jump indicator being stored in the register only if the loop jump indicator is greater than or equal to zero and less than a minimum buffer spacing. In a third state following the second state, the control circuit employs the adder circuit to add a loop start address to the current value in the register to obtain a modified current address, the modified current address being stored in the register only if the loop jump indicator was greater than or equal to zero and less than the minimum buffer spacing value.

A further understanding of the nature and advantages of the inventions herein may be realized by reference to the remaining portions of the specification and the attached drawings.

DESCRIPTION OF SPECIFIC EMBODIMENTS

The present invention finds application wherever bursty data must be received and buffered for further processing that may occur simultaneously with receipt of new data. One particular application is buffering audio data as received from a bursty source while accessing already buffered data points in a loop-like fashion. Data is accessed in order of address. When the loop limits are exceeded, access operations begin again at the start of the loop. This looping procedure may be used for playback of audio data.

FIGS. 2A–2D depicts looping through double buffers in accordance with one embodiment of the present invention. A first buffer 202 and a second buffer 204 each include a series of sequential memory locations and share a common address space. At any given time, one of the buffers is used for read access operations and the other buffer is filled with new data from a bursty source. A current address pointer (CA) 206 points to the currently accessed memory location. CA increments regularly by a phase increment PI. When the read access operations are for the purpose of playing back audio, the PI corresponds to a pitch shift factor or sample rate conversion factor. A PI of one corresponds to no pitch shift or sample rate change as compared to the pitch and sample rate of the audio data as recorded. A PI greater than one corresponds to an increase in pitch or decrease in sample rate as compared to what was recorded and a PI less than one corresponds to a decrease in pitch or increase in sample rate.

First buffer 202 and second buffer 204 are separated by a region of memory 208 that should be equal to or larger than the minimum possible buffer spacing. The minimum buffer spacing must be equal to or larger than the maximum phase increment. Preferably, the minimum buffer spacing is chosen to be an even power of 2.

In general loop operation, CA increments until LEA is exceeded. Once LEA is exceeded, CA jumps to LSA or some remainder slightly above LSA. LSA generally corresponds to the beginning of the buffer to be accessed next while LEA generally corresponds to the end of the currently accessed buffer. Switching between buffers is accomplished by changing the values of LSA and LEA.

Figure 1:
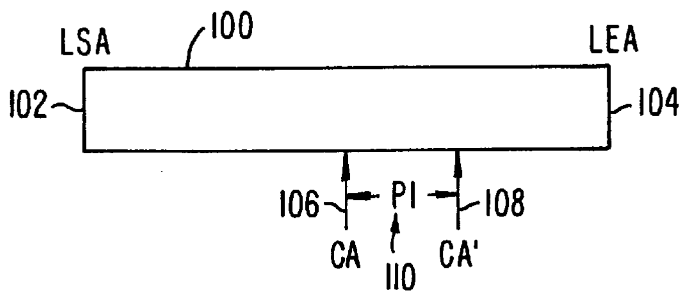
FIG. 1. PRIOR ART
FIG. 1 depicts a prior art looping scheme for wavetable playback.
Figure 2A:
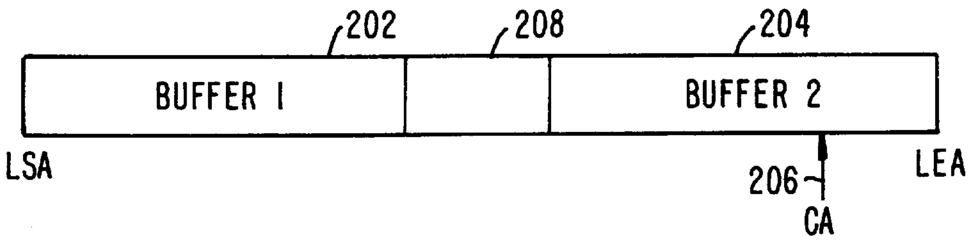
FIGS. 2A–2D depict looping through double buffers in accordance with one embodiment of the present invention.
Figure 2B:
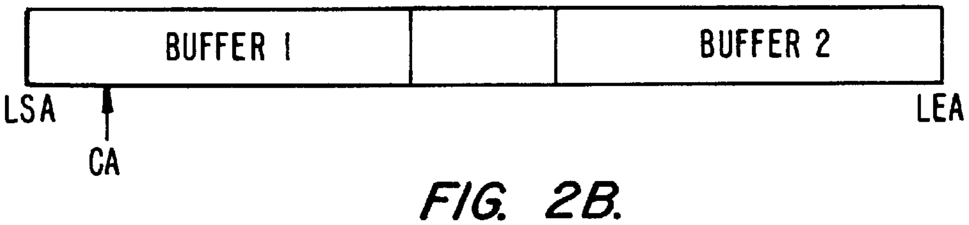
Figure 2C:
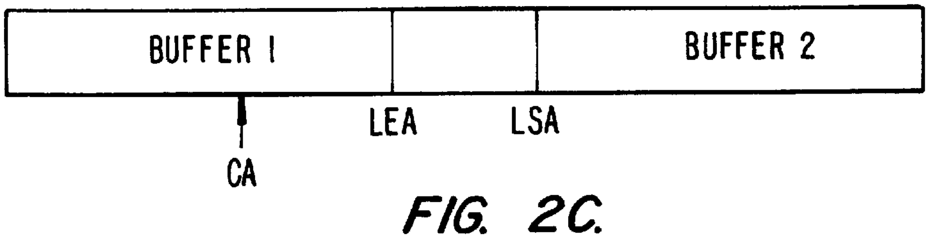

FIG. 2A shows the various address pointers when read access operations occurring in second buffer 204 while data is being loaded into first buffer 202. LSA is set to the beginning of first buffer 202 while LEA is set to just above the last word of second buffer 204. Once CA exceeds the LEA value shown in FIG. 2A, a jump occurs leading to the situation shown in FIG. 2B where CA is now located just above the beginning of first buffer 202.

Approximately simultaneously with the jump, loop interrupt for this channel is issued to a CPU that controls the flow of new data to the buffers and the values of LEA and LSA. The CPU responds by temporarily disabling further loop interrupts by this channel. Then, the CPU changes LEA to be the end of the first buffer and LSA to be the beginning of the second buffer. This is the situation shown in FIG. 2C. Once the pointers have been moved, the filling of second buffer 204 begins. The pointers are moved prior to the start of filling of second buffer 204 so that if a jump occurs prior to the complete refilling of second buffer 204, the jump will place CA near the beginning of second buffer 204 where new valid data will already be found. After second buffer 204 fills, further loop interrupts for this channel are reenabled.

Figure 2D:
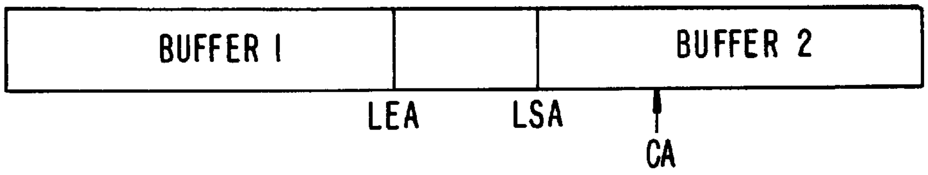

Now once CA passes LEA, it jumps forward to past LSA, the condition shown in FIG. 2D. It should be noted here that CA is still greater than LEA because LEA has not yet shifted to close to the end of second buffer 204. According to the present invention, the condition for jumping is not simply that CA equals or exceeds LEA. The present invention provides an additional condition for jumping, that CA–LEA not equal or exceed the minimum buffer spacing. If CA–LEA does equal or exceed the minimum buffer spacing and CA equals or exceeds LEA, this implies that CA is actually within second buffer 204 and no jump is desired. This assures that no further erroneous jump occurs in the situation shown in FIG. 2D where CA exceeds LEA only because LEA has not yet shifted to the end of second buffer 204.

Associated with the jump of CA back to second buffer 204 is another loop interrupt. Again, further loop interrupts for this channel are disabled. Then, LEA is changed to the end of second buffer 204 and LSA is changed to the beginning of first buffer 202. New audio data is directed to first buffer 202 and loop interrupts for this channel are re-enabled. The situation is again as depicted as in FIG. 2A and the cycle of switching between the two buffers continues.

Figure 3:
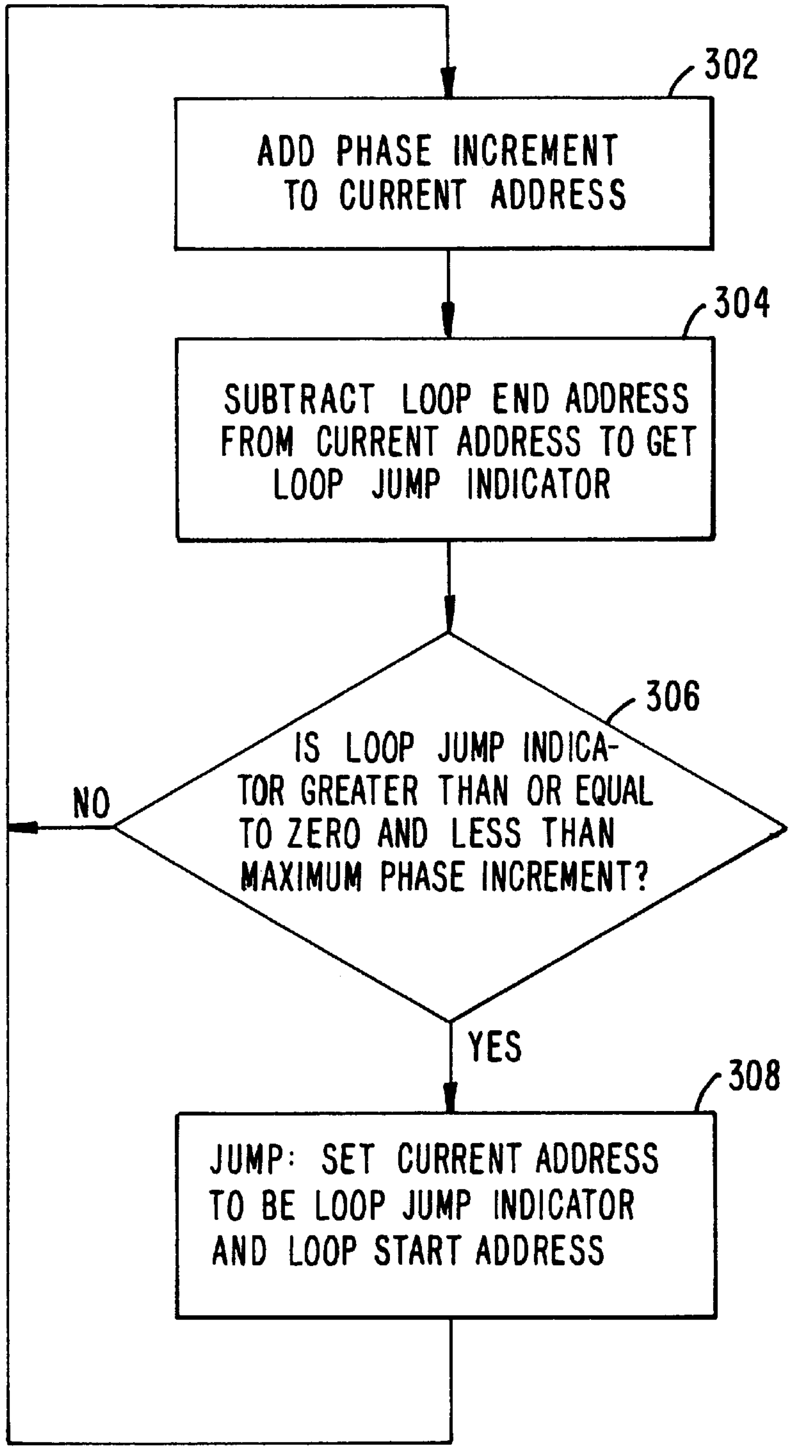
FIG. 3 is a flowchart describing steps of looping through double buffers in accordance with one embodiment of the present invention.

FIG. 3 is a flowchart describing steps of looping through double buffers in accordance with one embodiment of the present invention. The steps of the flowchart of FIG. 3 recur for each read access operation to the buffers. In a digital audio embodiment, the read access operations occur at a local audio sample rate. At step 302, the phase increment PI is added to CA to obtain a new current address, CA'. At step 304, a loop jump indicator, X is set equal to CA'–LEA. At step 306, X is tested. If X is greater than or equal to zero and less than the minimum buffer spacing, CA' is set equal to X+LSA, thus jumping to the beginning of the loop at step 308. If X is not greater than or equal to zero or not less than the minimum buffer spacing, CA is set equal to CA' and execution proceeds back to step 302. Execution also proceeds to step 302 after step 308.

The modification of LEA and LSA to switch between buffers occurs in response to the loop interrupts associated with the jumps caused by each invocation of step 308. Preferably, the procedure of FIG. 3 operates continuously and at the output sample rate to provide continuous access to a stream of data such as audio samples.

Figure 4:
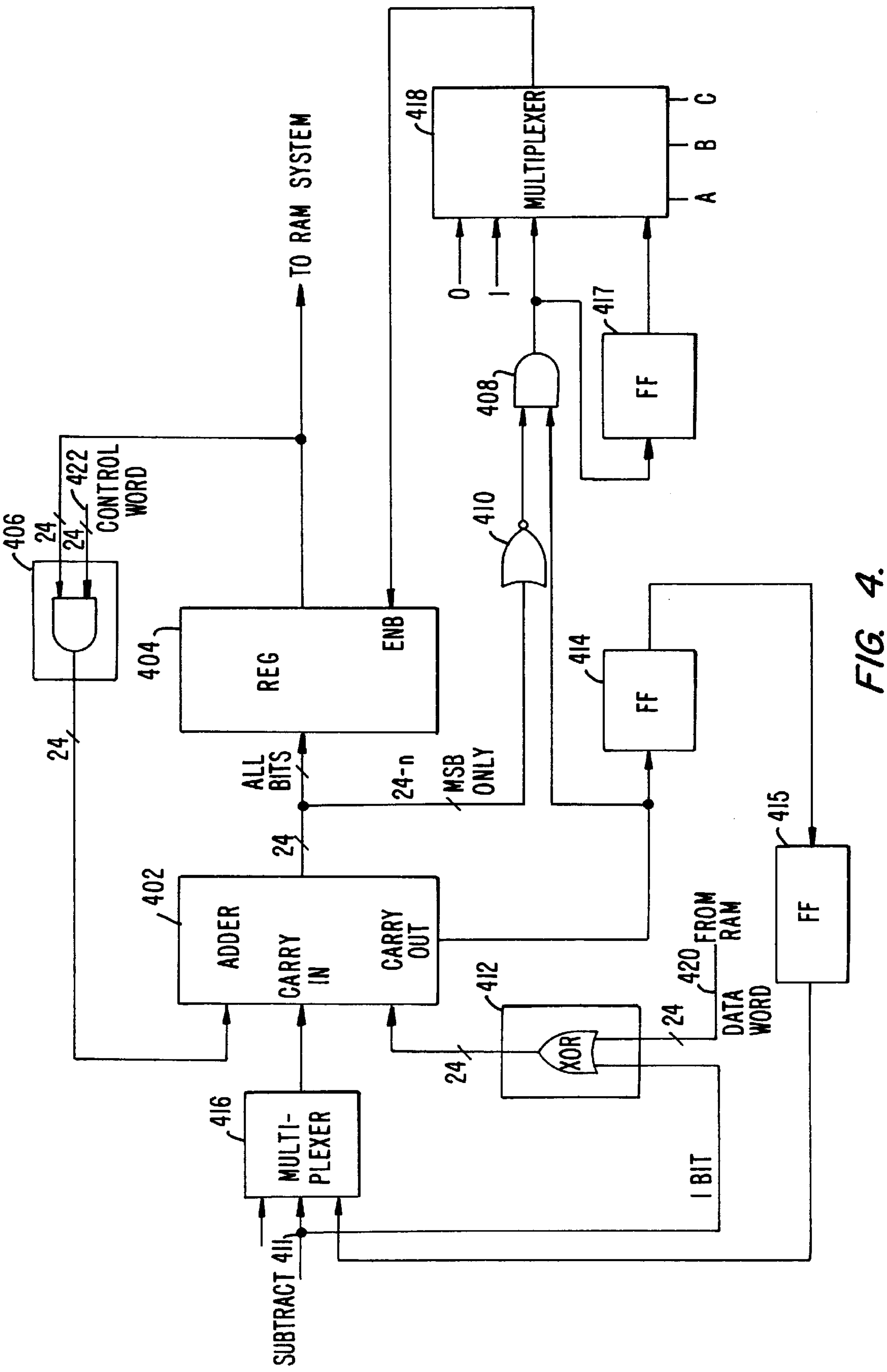
FIG. 4 is a circuit diagram showing circuitry for controlling looping through double buffers in accordance with one embodiment of the present invention.

FIG. 4 is a circuit diagram showing circuitry for controlling looping through double buffers in accordance with one embodiment of the present invention. A looping control circuit 400 includes an adder 402, a register 404, an AND gate block 406, an AND gate 408, a NOR gate 410, an XOR gate block 412, a first flip-flop 414, a second flip-flop 415, a first multiplexer 416, a third flip-flop 417, and a second multiplexer 418. These components are interconnected as shown in FIG. 4. In the preferred embodiment a 24 bit address space is used allowing addressing of up to 16 million samples.

XOR gate block 412 has two inputs. A first input is connected to a subtract signal 419 which is a single bit. A second input receives a 24 bit wide data word 420 from a RAM system (not shown). XOR gate block 412 includes 24 individual two-input XOR gates, each having subtract signal 414 as one input and a selected data bit of data word 420 as a second input. The output of XOR gate block 412 is 24 bits wide and consists of the individual outputs of each of the internal XOR gates.

AND gate block 406 has two inputs. A first input is a 24 bit wide output of register 404. A second input is a 24 bit wide control word 422. AND gate block 406 includes 24 individual AND gates, each one having one input taken from the output of register 404 and the other input taken from a corresponding bit of control word 422. The output of AND gate block 406 is 24 bits wide and consists of the individual outputs of the internal AND gates.

The operation of looping control circuit 400 may be characterized as a sequence of states. Each state is characterized by values of subtract signal 414, data word 420, control word 422, a select input to first multiplexer 416, and a select input to second multiplexer 418. Within the RAM system which provides data word 420 are found the values of CA, PI, LEA, and LSA as discussed above. CA and PI include both integer and fractional portions.

In state 1, the fractional portion of CA is loaded into register 404. This is accomplished by presenting the fractional portion of CA as data word 420, maintaining subtract signal 419 in a negated state, negating all of the bits of control word 422, selecting a negated state as the output of first multiplexer 416 and thus also as the carry input to adder 402, and selecting an asserted state as the output of second multiplexer 418 and thus as the enable input to register 404.

In state 2, a fractional part of PI is added to the fractional part of CA stored in register 404. Data word 420 is now set equal to the fractional part of PI. Subtract signal 419 remains in the negated state. To include the previously stored fractional part of CA in the addition, all of the bits of control word 422 are now asserted. The output of first multiplexer 416 is selected to be negated while the output of second multiplexer 418 is selected to be asserted. The resulting fractional part of CA is valid in register 404 during the subsequent state 3 and is stored in the RAM system during that state. The carry output of adder 402 is stored in flip-flop 414 for later use.

In state 3, an integer part of CA is loaded into register 404. The integer part of CA is presented as data word 420 while all the bits of control word 422 are negated. Subtract signal 419 remains negated. First multiplexer 416 selects a negated state as its output and second multiplexer 418 selects an asserted state as its output.

In state 4, an integer part of PI is added to the integer part of CA along with the carry resulting from the addition of the fractional parts. The integer part of PI is presented as data word 420 while all of the bits of control word 422 are asserted. Subtract signal 419 remains negated. First multiplexer 416 selects the output of second flip-flop 415 as its output. Thus the current carry input to adder 402 is the carry output that resulted from the addition of the fractional parts of PI and CA in state 2. Second multiplexer 418 selects a one to be the enable input to register 404. The result of state 4 is that CA' is stored in register 404 during subsequent state 5.

In state 5, LEA is subtracted from CA'. This is accomplished by presenting LEA as data word 420 while all of the bits of control word 422 are asserted. Subtract signal 419 is now asserted. First multiplexer 416 selects subtract signal 419 to be the carry input to adder 402. Thus, XOR gate 412 takes the one's complement of LEA. Adder 402 adds the one's complement of LEA, CA', and one together to obtain CA'−LEA.

In state 5, second multiplexer 418 selects the output of AND gate 408 to be the enable input to register 404. Thus register 404 latches CA'−LEA only if the output of AND gate 408 is asserted. For the output of AND gate 408 to be asserted, carry output of adder 402 must be asserted indicating that CA'−LEA is greater than or equal to zero. Also, the output of NOR gate 410 must be asserted. The inputs to NOR gate 410 are a selected number of the MSBs of the output of adder 402. If the minimum spacing between the buffers is $2^n$ samples, all but the n least significant bits are the inputs to NOR gate 410. Thus NOR gate 410 is asserted as long as CA'−LEA is less than the minimum buffer spacing. The output of AND gate 408 thus corresponds to the test of step 306. Thus, at the end of step 5, register 404 stores CA'−LEA only if the looping condition of step 306 has been met.

In state 6, LSA is added to register 404 if and only if the looping condition of step 306 was met in state 5. LSA is presented as data word 420. All of the bits of control word 422 are asserted. Subtract signal 419 is negated. First multiplexer 416 selects a negated state as its output. Second multiplexer 418 selects the output of third flip-flop 417 to be the enable input to register 404. Thus, LSA is added to the contents of register 404 but only if the looping condition had been satisfied in state 5. After state 6, the contents of register 404 will be the integer portion of the new CA whether or not a jump has occurred. If no jump has occurred, states 5 and 6 have no effect. If a jump has occurred, the modified new CA is equal to the old CA minus LEA plus LSA. During the subsequent state, the modified new CA is stored in the RAM system.

It will of course be understood that the circuitry of FIG. 4 is only representative and that there are many possible hardware and software implementations of the present invention. For example, adder 402 and/or register 404 may be cycle shared with other processing functions. If register 404 is used exclusively for looping control, the first described state may be unnecessary since CA will already be stored in register 404.

It should be noted that the output of AND gate 408 is usable an external indication of a jump. Such an indication may be useful to form the loop interrupt signal for the channel that causes LEA and LSA to change and causes new audio data to be redirected.

In the foregoing specification, the invention has been described with reference to specific exemplary embodiments thereof. It will, however, be evident that various modifications and changes may be made thereunto without departing from the broader spirit and scope of the invention as set forth in the appended claims and their full scope of equivalents. For example, the looping control techniques disclosed herein are not limited to ping-pong buffering applications but will find application wherever satisfaction of looping criteria potentially requires jumping to a higher address. For instance, one may read samples in wavetable fashion from one area of memory until a predetermined time elapses and then switch to reading from another higher area of memory.

What is claimed is:

1. In a digital audio system, a method for buffering audio data received from a bursty source and controlling read access to said audio data, said method comprising steps of:

a) providing a first buffer and a second buffer, each of said buffers comprising a plurality of sequential memory locations in an address space common to both buffers, wherein audio data received from said source fills a selected one of said first and said second buffers, the other buffer being available for read access;

b) adding a phase increment to a current playback address; thereafter c) subtracting a loop end address from said current playback address to obtain a loop jump indicator; and thereafter d) if said loop jump indicator is greater than or equal to zero and less than a minimum spacing between said first and second buffers, setting said current address to be said loop jump indicator plus a loop start address to cause read operations to continue in said selected one buffer.

2. The method of claim 1 further comprising the step of:

e) if said loop jump indicator is greater than or equal to zero and less than said minimum spacing, setting said loop start address to be a beginning of said other buffer and said loop end address to be an end of said selected one buffer, and directing said audio data received from said source to said other buffer.

3. The method of claim 2 further comprising the step of:

repeating said b), c), d), and e) steps for continuous reading from said first and second buffers.

4. The method of claim 1 wherein said minimum spacing corresponds to a maximum value of said phase increment.

5. A loop control circuit that generates a current address for read access operations from first and second buffers sharing a common address space, said circuit comprising:

a register;

an adder circuit; and a control circuit that in a first state, employs said adder circuit to add a phase increment to a current address for read operations stored in said register to obtain a new current address, storing said new current address in said register;

in a second state following said first state, employs said adder circuit to subtract a loop start address from said new current address as stored in said register to obtain a loop jump indicator, said loop jump indicator being stored in said register only if said loop jump indicator is greater than or equal to zero and less than a minimum spacing between said first and second buffers; and in a third state following said second state, employs said adder circuit to add a loop start address to the current value in said register to obtain a modified current address, said modified current address being stored in said register only if said loop jump indicator was greater than or equal to zero and less than said minimum spacing.

6. The apparatus of claim 5 wherein said minimum spacing corresponds to a maximum value of said phase increment.

7. In a digital audio system, apparatus for buffering audio data received from a bursty source and controlling read access to said audio data, said apparatus comprising:

a first buffer and a second buffer, each of said buffers comprising a plurality of sequential memory locations in an address space common to both buffers, wherein audio data received from said source fills one of said first and said second buffers, the other buffer being available for read access; and an adder that adds a phase increment to a current playback address in said address space to obtain a new current playback address and thereafter subtracts a loop end address from said current playback address to obtain a loop jump indicator; and that if said loop jump indicator is greater than or equal to zero and less than a minimum spacing between said first and second buffers, adds a loop start address to said loop jump indicator to obtain a modified new current playback address.

8. The apparatus of claim 7 wherein said minimum spacing corresponds to a maximum value of said phase increment.

9. In a digital audio system, a method for reading audio data stored in first and second areas of memory that share a common address space:

a) adding a phase increment to a current playback address in said second area; thereafter c) subtracting a loop end address from said current playback address to obtain a loop jump indicator; and thereafter d) if said loop jump indicator is greater than zero and less than a minimum spacing between said first and second areas, setting said current address to be said loop jump indicator plus a loop start address to cause read operations to continue in said first area.

10. The method of claim 9 wherein said first area is above said second area in said common address space.

11. The method of claim 9 wherein said second area is above said first area in said common address space.

12. In a digital audio system, apparatus for reading audio data stored in first and second areas of memory that share a common address space wherein said second area is above said first area, said apparatus comprising:

an adder that adds a phase increment to a current playback address in said second area, and thereafter subtracts a loop end address from said current playback address to obtain a loop jump indicator; and that thereafter if said loop jump indicator is greater than zero and less than a minimum spacing between said first and second areas, sets said current address to be said loop jump indicator plus a loop start address to cause read operations to continue in said first area.

13. The apparatus of claim 12 wherein said first area is above said second area in said common address space.

14. The apparatus of claim 12 wherein said second area is above said first area in said common address space.

* * * * *

UNITED STATES PATENT AND TRADEMARK OFFICE

CERTIFICATE OF CORRECTION

PATENT NO. : 6,016,522

DATED : January 18, 2000

INVENTOR(S) : David P. Rossum

It is certified that error appears in the above-indentified patent and that said Letters Patent is hereby corrected as shown below:

On the title page, item

[73] Assignee: Creative Technology Ltd.

Signed and Sealed this

Twenty-seventh Day of March, 2001

Attest:

*Nicholas P. Godici*

NICHOLAS P. GODICI

*Attesting Officer*

*Acting Director of the United States Patent and Trademark Office*